(12) United States Patent
Hwang et al.

(10) Patent No.: US 11,938,538 B2
(45) Date of Patent: Mar. 26, 2024

(54) METHOD OF LASER-ASSISTED METAL-PLASTIC HYBRID 3D PRINTING AND MULTILAYERED STRUCTURE BY USING THEREOF

(71) Applicant: KOREA INSTITUTE OF SCIENCE AND TECHNOLOGY, Seoul (KR)

(72) Inventors: Junyeon Hwang, Wanju-gun (KR); Siwon Yu, Wanju-gun (KR); Byeongguk Kim, Wanju-gun (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 119 days.

(21) Appl. No.: 17/897,896

(22) Filed: Aug. 29, 2022

(65) Prior Publication Data
US 2023/0079537 A1 Mar. 16, 2023

(30) Foreign Application Priority Data

Sep. 8, 2021 (KR) .................. 10-2021-0119581
Aug. 24, 2022 (KR) .................. 10-2022-0106450

(51) Int. Cl.
*B22F 10/50* (2021.01)
*B22F 10/28* (2021.01)
(Continued)

(52) U.S. Cl.
CPC .............. *B22F 10/50* (2021.01); *B22F 10/28* (2021.01); *B22F 12/41* (2021.01); *B29C 64/153* (2017.08); *B29C 64/268* (2017.08); *B33Y 10/00* (2014.12); *B33Y 30/00* (2014.12); *B33Y 80/00* (2014.12); *B22F 2301/052* (2013.01); *B29K 2077/00* (2013.01)

(58) Field of Classification Search
CPC .......... B22F 10/28; B22F 10/50; B22F 12/41; B22F 2301/052; B22F 7/008; B29K 2077/00; B29C 64/153; B29C 64/268; B29C 64/336; B33Y 10/00; B33Y 30/00; B33Y 40/00; B33Y 80/00
See application file for complete search history.

(56) References Cited

U.S. PATENT DOCUMENTS

| 2003/0044593 | A1* | 3/2003 | Vaidyanathan ....... B29C 64/165 428/297.4 |
| 2018/0272608 | A1 | 9/2018 | Yun |
| 2019/0202101 | A1* | 7/2019 | Tucker .................. B29C 64/241 |

FOREIGN PATENT DOCUMENTS

KR    10-2018-0109042 A    10/2018

* cited by examiner

*Primary Examiner* — Dana Ross
*Assistant Examiner* — Joe E Mills, Jr.

(57) ABSTRACT

Provided is a method of producing a metal-plastic multilayered hybrid structure by using laser three-dimensional (3D) printing, the method including printing a metal structure on a substrate by using a first laser, patterning an upper surface of the metal structure by using the first laser, printing a polymer bonding layer on the patterned metal structure by using the first laser, and printing a polymer structure on the polymer bonding layer by using a second laser having a wavelength longer than a wavelength of the first laser, wherein the printing of the polymer bonding layer includes forming an intermediate phase at an interface between the metal structure and the polymer bonding layer. A layered structure produced using the above method may include the intermediate phase having the effect of an oxygen inclusion connecting a metal and a polymer.

20 Claims, 9 Drawing Sheets

(51) Int. Cl.
*B22F 12/41* (2021.01)
*B29C 64/153* (2017.01)
*B29C 64/268* (2017.01)
*B29K 77/00* (2006.01)
*B33Y 10/00* (2015.01)
*B33Y 30/00* (2015.01)
*B33Y 80/00* (2015.01)

METHOD OF LASER-ASSISTED METAL-PLASTIC HYBRID 3D PRINTING AND MULTILAYERED STRUCTURE BY USING THEREOF

CROSS-REFERENCE TO RELATED PATENT APPLICATIONS

This application claims the benefit of Korean Patent Application No. 10-2021-0119581, filed on Sep. 8, 2021, and Korean Patent Application No. 10-2022-0106450, filed on Aug. 24, 2022, in the Korean Intellectual Property Office, the disclosures of which are incorporated herein in their entireties by reference.

BACKGROUND

1. Field

The present invention relates to a method of producing a metal-plastic hybrid assembly by using laser three-dimensional (3D) printing, and a multi-layered structure produced using the method and, more particularly, to a method of producing a 3D printed structure by bonding organic-inorganic materials having different properties, functions, and uses, e.g., a metal, a ceramic, and a plastic, by using a laser in a single printing process, and a multilayered structure produced using the method.

2. Description of the Related Art

Currently, research is mainly focused on replacing an existing metal with a light and strong plastic due to the demand for a reduction in material weight, or on hybridizing a metal and a plastic together depending on a required strength site. In particular, a organic-inorganic bonding or joining technology for integrating or combining a metal and a plastic is regarded as a core technology in the automobile and medical industries, and market demand therefor is steadily increasing. This is part of efforts not only to solve resource, energy, and environmental issues but also to meet the demand for high-performance hybridization for a light weight and property customization.

The technology for joining a metal and a plastic is not new. Traditionally, a mechanical fixing and fastening method using screws or rivets or a chemical bonding method using an adhesive have been mainly used. However, these existing methods have a fundamental limitation that physical, mechanical, and chemical properties are not compatible between the metal and the plastic, and also have many problems to be solved, e.g., a long process time and an environmental issue.

To solve these problems, technologically advanced countries such as Japan and Germany have developed a laser-assisted metal and plastic (LAMP) process technology that uses a laser to induce bonding between materials having different properties, e.g., a metal, a ceramic, and a plastic, and thus have developed an organic-inorganic bonding technology that exhibits higher adhesive properties compared to existing adhesives and bolting technology. The LAMP process is a method in which an irradiated laser is transmitted to a metal-plastic interface to induce a close bond between the metal and the plastic by the laser heat.

However, this method needs to use a transparent plastic or has a difficulty in designing to transfer heat to the metal-plastic interface by heating the metal surface, and has a technical limitation of insufficient applicability to complicated structures. In addition, a large number of air bubbles induced at the metal-plastic interface heated by the laser may remain in the plastic region and serve as defects that badly influence a bonding strength.

Therefore, a new metal-plastic bonding process which is differentiated from the existing post-process for simply bonding a metal and a plastic needs to be developed.

RELATED ART DOCUMENT

Patent Document

Korean Patent Publication No. 10-2018-0109042

SUMMARY

As described above, in general, organic-inorganic multi-layered materials may not be easily bonded and three-dimensionally (3D)-printed due to a weak adhesive force between an organic polymer and an inorganic metal or ceramic. The present invention provides a method of producing a metal-plastic multi-layered structure by using laser 3D printing by continuously forming a high-adhesion structure regardless of the types of materials, and a layered structure produced using the method. However, the scope of the present invention is not limited thereto.

According to an embodiment of the present invention, there is provided a method of producing a metal-plastic multi-layered structure by using laser three-dimensional (3D) printing, the method including printing a metal structure on a substrate by using a first laser, patterning an upper surface of the metal structure by using the first laser, printing a polymer bonding layer on the patterned metal structure by using the first laser, and printing a polymer structure on the polymer bonding layer by using a second laser having a wavelength longer than a wavelength of the first laser, wherein the printing of the polymer bonding layer includes forming an intermediate phase at an interface between the metal structure and the polymer bonding layer.

The intermediate phase may be formed through second-order reaction at the interface between the metal structure and the polymer bonding layer, and be formed when at least any part of a polymer included in the polymer bonding layer is melted or sintered and reacts with a part of the metal structure.

The intermediate phase may include a carbon-metal oxide induced by the first laser.

The carbon-metal oxide may be formed when an organic group of the polymer is thermally or optically decomposed by the first laser and thus a part of the decomposed organic group reacts with a metal or metal oxide on a surface of the metal structure.

The carbon-metal oxide may include a compound represented by Chemical Formula 1.

$$M\text{-}O\text{-}C \qquad \text{[Chemical Formula 1]}$$

(where M denotes a material selected from among inorganic metals and ceramics, and alloys thereof, C denotes a material selected from among polymers including carbon and carbon compounds, and O denotes an oxygen inclusion connecting M and C.)

At least one of M and C may be an oxide or an organic group.

To have a high absorption rate for metals and inorganic materials, the first laser may have a wavelength band ranging from 0.1 μm to 10 μm.

The first laser may include a fiber or yttrium aluminum garnet (YAG) laser.

To have a high absorption rate for polymers and organic materials, the second laser may have a wavelength band ranging from 1 μm to 100 μm.

The second laser may include a $CO_2$ or diode laser.

The patterning of the upper surface of the metal structure may include forming joining patterns by etching parts of the upper surface of the metal structure by using the first laser to induce mechanical anchoring between a metal and a polymer.

The polymer bonding layer may include a transparent polymer.

The polymer may include at least one type of thermoplastic polymer resin selected from the group consisting of polylactic acid, acrylonitrile butadiene styrene, polypropylene, polyethylene, polystyrene, polyamide, polycarbonate, polyvinyl chloride, chlorinated polyvinyl chloride, styreneacrylonitrile, acrylonitrile styrene acrylate, polysulfone, polyurethane, polyphenylenesulfide, polyacetal, polyaramid, polyimide, polyester, polyester elastomer, esther acrylate, ethylene copolymer, styrene-butadiene copolymer, and vinyl acetate, or a polymer composite including the thermoplastic polymer resin.

The metal structure may include at least one type of material selected from the group consisting of stain steel, nickel, cobalt, copper, titanium, aluminium, magnesium, silicon, iron, zinc, tungsten, and manganese, or an alloy thereof.

The printing of the polymer bonding layer may include forming the intermediate phase by inducing chemical reaction between a metal included in the metal structure and a polymer included in the polymer bonding layer, by irradiating the first laser to the interface between the metal structure and the polymer bonding layer.

An energy density of the first laser to print the polymer bonding layer may be lower than an energy density of the first laser to print the metal structure.

An energy density to print the polymer bonding layer may be controlled by separately adjusting power of the first laser, a scan speed, a single layer height, and a hatch spacing.

An energy density of the first laser to print the polymer bonding layer may have a range in which the polymer bonding layer is not completely carbonized.

The range in which the polymer bonding layer is not completely carbonized may be 0.3 times to 0.7 times an energy density of the first laser to print the metal structure.

According to another embodiment of the present invention, there is provided a metal-plastic multi-layered structure produced using laser three-dimensional (3D) printing according to the method of claim 1, the structure including a metal structure, a polymer structure provided on the metal structure, and an intermediate phase formed at an interface between the metal structure and the polymer structure, wherein the intermediate phase is formed when at least any part of a polymer included in the polymer structure is melted or sintered by a laser and reacts with a part of the metal structure.

BRIEF DESCRIPTION OF THE DRAWINGS

The above and other features and advantages of the present invention will become more apparent by describing in detail embodiments thereof with reference to the attached drawings in which.

DETAILED DESCRIPTION

Figure 1:
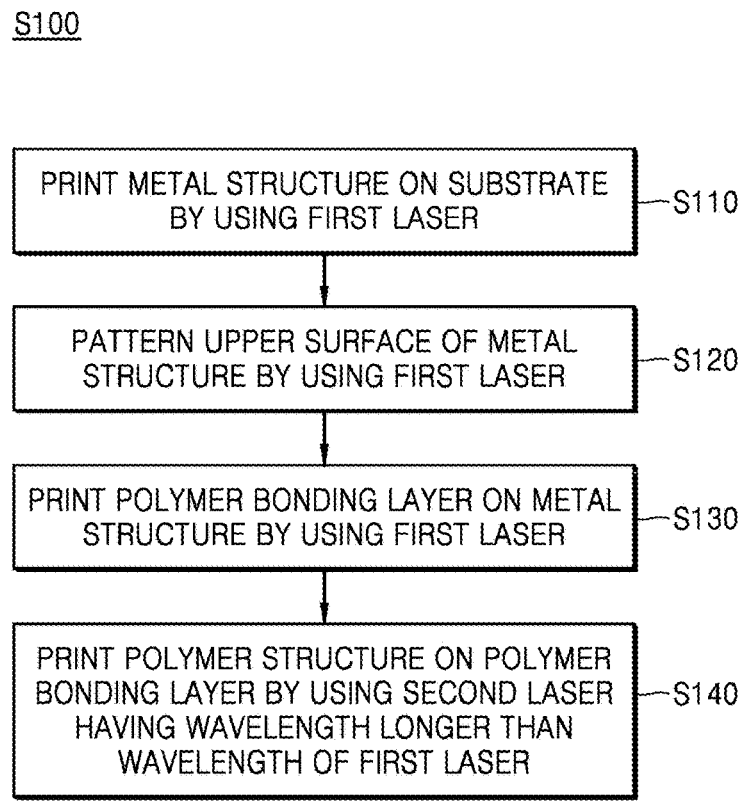
FIG. 1 is a flowchart of a method of layering and bonding metal-plastic multi-layered hybrid materials by using laser three-dimensional (3D) printing, according to an embodiment of the present invention.

Hereinafter, the present invention will be described in detail by explaining embodiments of the invention with reference to the attached drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the thicknesses or sizes of layers are exaggerated for clarity and convenience of explanation.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, the embodiments of the invention should not be construed as limited to the particular shapes of regions illustrated herein, but are to include deviations in shapes that result, for example, from manufacturing.

FIG. 1 is a flowchart of a method S100 of layering and bonding metal-plastic multi-layered hybrid materials by using laser three-dimensional (3D) printing, according to an embodiment of the present invention.

Referring to FIG. 1, the method S100 according to an embodiment of the present invention may include printing a metal structure on a substrate by using a first laser (S110). At this time, the method S100 may include patterning an upper surface of the metal structure by using the first laser (S120).

Then, the method S100 may include printing a polymer bonding layer on the patterned metal structure by using the first laser (S130). At this time, an intermediate phase may be formed at an interface between the metal structure and the polymer bonding layer. Then, the method S100 may include printing a polymer structure on the polymer bonding layer by using a second laser having a wavelength longer than the wavelength of the first laser (S140). Herein, the first laser refers to a short-wavelength laser, and the second laser refers to a long-wavelength laser. Wavelength bands and powers of the short-wavelength laser and the long-wavelength laser will be described in detail below with reference to the following drawings.

Figure 2:
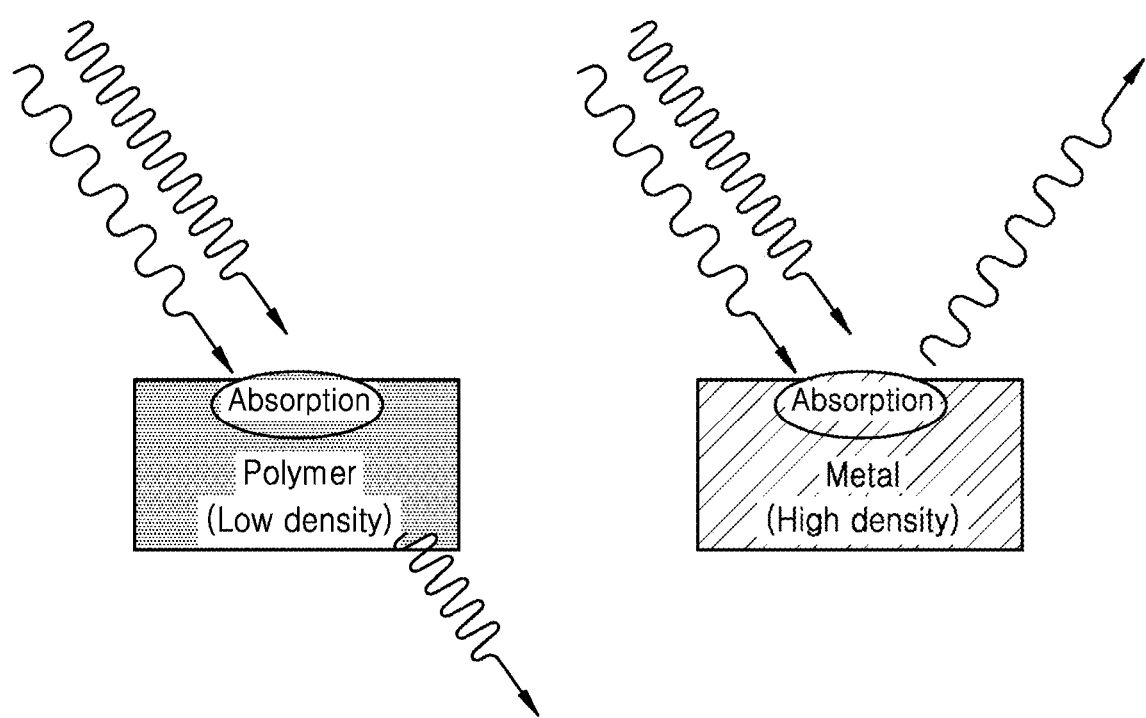
FIG. 2 is a diagram for describing a difference in energy absorption rate of 3D-printed materials based on a wavelength band of a laser, according to an embodiment of the present invention.

FIG. 2 is a diagram for describing a difference in energy absorption rate of 3D-printed materials based on a wavelength band of a laser, according to an embodiment of the present invention, and Table 1 numerically shows laser absorption rates of various materials.

TABLE 1

| | Absorption Rate (%) | |
|---|---|---|
| Material | Fiber Laser (up to 1.06 μm) | $CO_2$ Laser (up to 10.7 μm) |
| Metals (e.g., Cu, Fe, Sn, Ti, and Pb) | 55 to 70 | 25 to 55 |
| Ceramics (e.g., $ZnO_2$, $Al_2O_3$, and $SiO_2$) | 2 to 80 | 50 to 90 |
| Polymers (e.g., PA, PMMA, and PTFE) | 5 to 10 | 70 to 95 |
| Alloys (e.g., $Cu_{10}Al$) | 64 to 80 | 30 to 45 |

Referring to FIG. 2 and Table 1, it is shown that each material exhibits a different absorption rate based on a laser wavelength. When a $CO_2$ laser having a wavelength band shorter than or equal to 10.7 μm is irradiated to a low-density transparent polymer, most of the laser is absorbed into the polymer. On the other hand, when a fiber laser having a wavelength band shorter than or equal to 1.06 μm is irradiated, most of the laser is transmitted through the polymer.

When the $CO_2$ laser having a wavelength band shorter than or equal to 10.7 μm is irradiated to a metal having a density higher than that of the polymer, most of the laser is not transmitted through and is reflected on the metal. On the other hand, when the fiber laser having a wavelength band shorter than or equal to 1.06 μm is irradiated, most of the laser is absorbed into the metal.

The present invention is devised considering the different laser absorption rate of each material based on the laser type. To improve bonding properties of an interface where the metal is in contact with the polymer, an intermediate phase is formed at the bonded interface by alternately using the fiber laser having a wavelength band shorter than or equal to 1.06 μm, and the $CO_2$ laser having a wavelength band shorter than or equal to 10.7 μm.

That is, the formation of the intermediate phase at a region where the metal is in contact with the polymer, i.e., the interface between the metal structure and the polymer bonding layer, serves as a critical factor in the present invention. The intermediate phase is to obtain a high-strength bond between metal-plastic materials, and the bonded interface may be easily controlled by adjusting the wavelength of the laser irradiated in the printing process. The method of forming the intermediate phase will now be described in detail with reference to FIGS. 3 to 6.

FIGS. 3 to 6 are cross-sectional diagrams for describing a method of layering and bonding metal-plastic hybrid materials by using laser 3D printing, according to an embodiment of the present invention.

Figure 3:
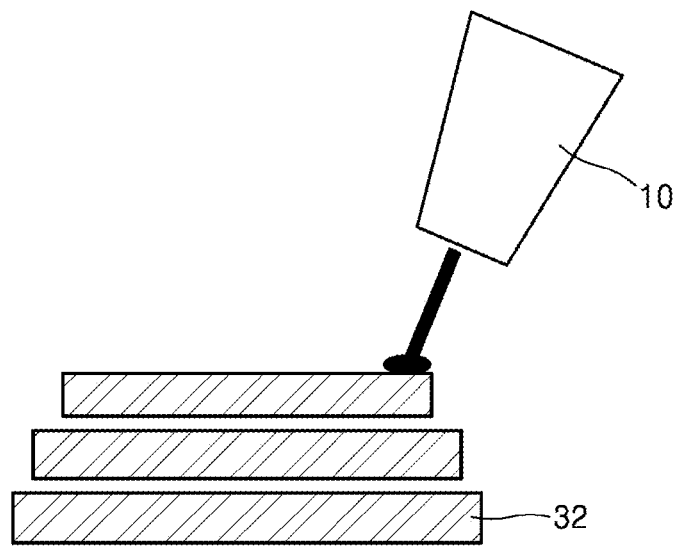
FIGS. 3, 4, 5, and 6 are cross-sectional diagrams for describing a method of layering and bonding metal-plastic multi-layered hybrid materials by using laser 3D printing, according to an embodiment of the present invention.
Figure 4:
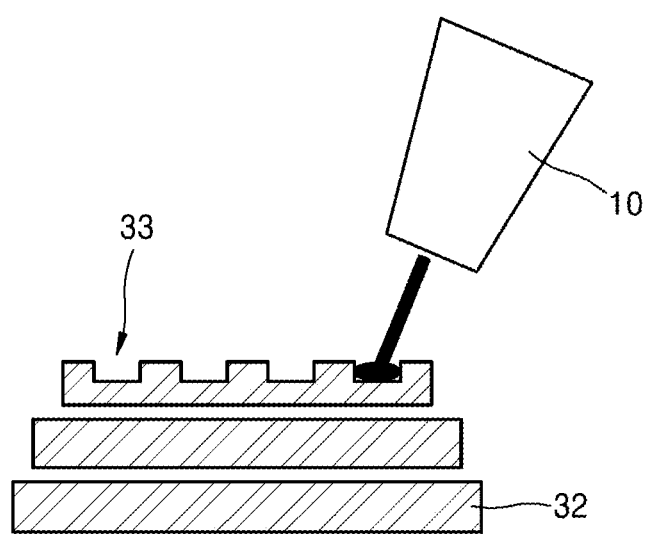

Referring to FIGS. 3 and 4, a metal structure 32 may be formed on a substrate by irradiating a first laser 10 to powder of a metal. Herein, the substrate refers to a separate member capable of transporting a stage of a 3D printer or a produced structure. The first laser 10 may be selected as a short-wavelength laser based on the type of the metal and include, for example, a fiber laser or an yttrium aluminum garnet (YAG) laser. At this time, the laser wavelength needs to be selected considering a difference in absorption rate of the material. To facilitate the control of interfacial properties between metal-plastic materials, the metal structure 32 is layered upward from a bottom surface of the substrate in a bottom-up manner based on a designed drawing.

An upper surface of the metal structure 32 includes dangling bonds unlike a crystalline coordination in the metal structure 32. To improve wettability and affinity with a polymer included in a polymer structure (not shown), various functional groups may be adopted to the dangling bonds. At this time, the functional group may be formed by additionally performing a chemical process, e.g., a plasma process, on the surface of the metal structure 32 where the dangling bonds are formed.

For example, a continuous wave (CW) fiber or YAG laser having a wavelength band of 0.1 μm to 10 μm may be used to form the metal structure 32. Process parameters for printing the metal structure 32 may include laser power, a scan speed, a single layer height, and a hatch spacing.

The laser power may be controlled to a range of 350 W to 500 W, and particularly, to 350 W, and the scan speed may be controlled to a range of 400 mm/s to 1500 mm/s, and particularly, to 470 mm/s. The single layer height may be controlled to a range of 0.01 mm to 0.1 mm, and particularly, to 0.04 mm, and the hatch spacing may be controlled to a range of 0.1 mm to 0.5 mm, and particularly, to 0.2 mm. An energy density at this time may be controlled to a range of 50 $W/mm^3$ to 150 $W/mm^3$, particularly, to a range of 80 $W/mm^3$ to 100 $W/mm^3$, and more particularly, to 93.09 $W/mm^3$.

Referring to FIG. 4, the upper surface of the metal structure 32 may be patterned using the first laser 10. By directly forming metal patterns 33, which correspond to a physical coupling structure, on the upper surface of the metal structure 32 through patterning, an organic-inorganic bonding strength may be increased through physical bonding in addition to chemical bonding.

The first laser 10 may use the same power used when the metal structure 32 is formed. At this time, the metal patterns 33 may be formed in a concave-convex coupling structure to induce mechanical coupling between the metal structure 32 and a polymer bonding layer. Herein, instead of a simple concave-convex coupling structure, the metal patterns 33 may be formed to be gradually reduced in area from upper to lower parts thereof. Alternatively, the metal patterns 33 may be formed in multiple layers. In addition, upper and side surfaces of the metal patterns 33 may be controlled to have a high surface roughness to further increase bonding force.

A laser used later to pattern the upper surface of the metal structure 32 may be the same as the laser used to print the metal structure 32. The laser power may be controlled to a range of 350 W to 500 W, and particularly, to 350 W, and the scan speed may be controlled to a range of 400 mm/s to 1500 mm/s, and particularly, to 470 mm/s. The single layer height may be controlled to a range of 0.01 mm to 0.1 mm, and particularly, to 0.04 mm, and the hatch spacing may be controlled to a range of 0.1 mm to 1.0 mm, and particularly, to 0.4 mm. The energy density at this time may be controlled to a range of 10 $W/mm^3$ to 100 $W/mm^3$, particularly, to a range of 20 $W/mm^3$ to 80 $W/mm^3$, and more particularly, to 46.54 $W/mm^3$.

Figure 5:
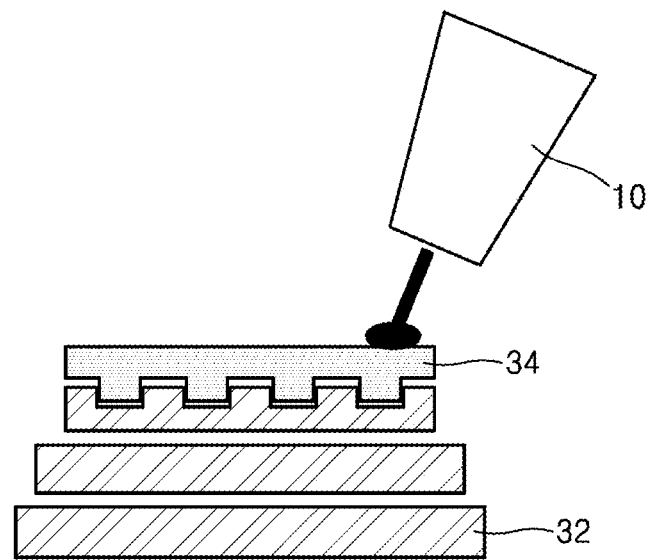

Referring to FIG. 5, a polymer bonding layer 34 may be formed on the metal structure 32 by using the first laser 10 having a wavelength band of 0.1 μm to 10 μm. Herein, an energy density to print the polymer bonding layer 34 may be controlled to be lower than the energy density to print the metal structure 32 by controlling the process parameters such as the power of the first laser 10, the scan speed, the single layer height, and the hatch spacing.

Herein, a polymer used for the polymer bonding layer 34 may include, for example, a transparent polymer to facilitate transmission and absorption of the first laser 10. The metal structure 32 needs to be controlled to a small thickness to enable transmission and absorption of the first laser 10.

When the polymer bonding layer 34 is formed using the first laser 10, an intermediate phase may be formed at an interface where the polymer bonding layer 34 is in contact with the metal structure 32. The intermediate phase may be formed through second-order reaction at the interface between the metal structure 32 and the polymer bonding layer 34. The intermediate phase is formed when a part of the polymer included in the polymer bonding layer 34 is melted and reacts with the surface of the metal structure 32. At this time, the intermediate phase may be formed in a part or the entirety of the polymer bonding layer 34 depending on a thickness of the polymer bonding layer 34.

The intermediate phase is a second phase formed through chemical bonding reaction, and may enable a high-density cross-link to form a 3D structure having a very high bonding strength. More specifically, the intermediate phase may be a carbon-metal oxide induced by the laser and represented by Chemical Formula 1, and be formed when a part of the polymer included in the polymer bonding layer 34 is thermally and optically decomposed by the laser and reacts with the metal or metal oxide on the surface of the metal structure 32.

M-O—C                                [Chemical Formula 1]

(where M denotes a material selected from among inorganic metals and ceramics, and alloys thereof, C denotes a material selected from among polymers including carbon and carbon compounds, and O denotes an oxygen inclusion connecting M and C.)

At least one of M and C is an oxide or an organic group.

An energy density is a very critical factor. In 3D printing, when a bonding layer is formed by melting a material, although power of a laser exerts the largest influence, the formed structure varies depending on an energy density considering a scan speed of the laser, a single layer height, and a hatch spacing.

For example, an energy density of the fiber laser to print the polymer bonding layer 34 may be lower than the energy density of the fiber laser to print the metal structure 32. Particularly, the energy density of the fiber laser to print the polymer bonding layer 34 may be allowed to a range in which the polymer bonding layer 34 is not completely carbonized. More particularly, the energy density may satisfy about 0.3 times to about 0.7 times the energy density of the fiber laser to print the metal structure 32. Still more particularly, the polymer bonding layer 34 may be formed using a low energy density corresponding to about ½ of the energy density initially used to form the metal structure 32.

The CW fiber or YAG laser having a wavelength band of 0.1 μm to 10 μm may also be used to form the polymer bonding layer 34 but, at this time, the process parameters such as the laser power, the scan speed, the single layer height, and the hatch spacing need to be controlled differently to reduce the energy density. The laser power may be controlled to a range of 50 W to 200 W, and particularly, to 150 W, and the scan speed may be controlled to a range of 400 mm/s to 1500 mm/s, and particularly, to 400 mm/s. The single layer height may be controlled to a range of 0.01 mm to 0.1 mm, and particularly, to 0.04 mm, and the hatch spacing may be controlled to a range of 0.1 mm to 0.5 mm, and particularly, to 0.2 mm. The energy density at this time may be controlled to a range of 10 W/mm$^3$ to 100 W/mm$^3$, particularly, to a range of 20 W/mm$^3$ to 80 W/mm$^3$, and more particularly, to 46.87 W/mm$^3$.

Figure 6:
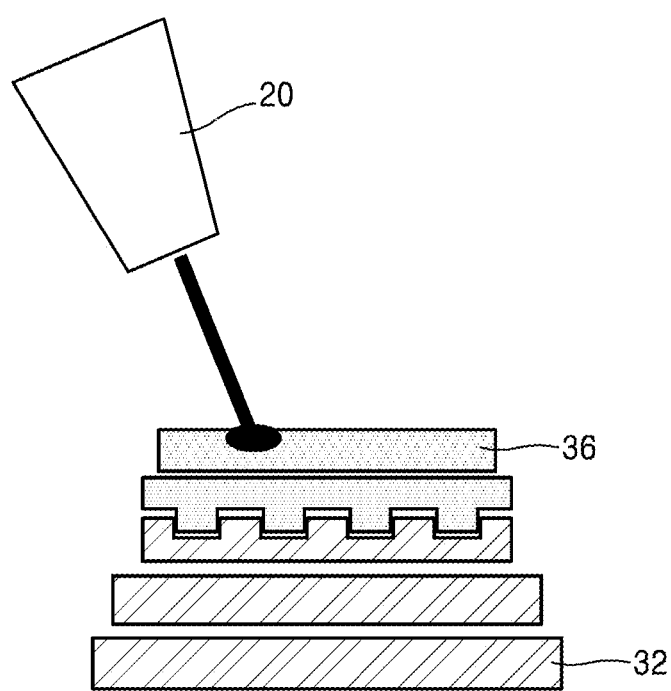

Referring to FIG. 6, a polymer structure 36 may be printed on the polymer bonding layer 34 by using a second laser 20 having a wavelength longer than the wavelength of the first laser 10. The second laser 20 may be selected as a long-wavelength laser based on the type of a polymer and include, for example, a $CO_2$ laser. At this time, the laser wavelength needs to be selected considering a difference in absorption rate of the material. The polymer structure 36 may use the same polymer as the polymer bonding layer 34, or use a different polymer in some cases.

A $CO_2$ laser having a wavelength band of 1 μm to 100 μm may be used to print the polymer structure 36. The laser power may be controlled to a range of 10 W to 45 W, and particularly, to 35 W, and the scan speed may be controlled to a range of 100 mm/s to 4000 mm/s, and particularly, to 3000 mm/s. The single layer height may be controlled to a range of 0.01 mm to 0.1 mm, and particularly, to 0.05 mm, and the hatch spacing may be controlled to a range of 0.1 mm to 0.5 mm, and particularly, to 0.2 mm. The energy density at this time may be controlled to a range of 0.1 W/mm$^3$ to 5 W/mm$^3$, particularly, to a range of 0.5 W/mm$^3$ to 3 W/mm$^3$, and more particularly, to 1.5 W/mm$^3$.

Test examples of the present invention will now be described. However, the following test examples are merely for better understanding of the present invention, and the present invention is not limited thereto.

For the test examples of the present invention, samples were produced using a dual laser 3D printing system in a 200 mm×200 mm×200 mm working space. The 3D printing system includes two types of power supply modules and power build modules and one type of re-coater module to separately supply metal powder and polymer powder. The 3D printing system is equipped with two types of lasers (e.g., a fiber laser and a $CO_2$ laser) and one type of scanner module to process a metal and a polymer, and has $O_2$ blocking and vacuuming functions to prevent sparks during laser processing.

Initially, as raw metal powder, the samples according to the test examples of the present invention used spherical Al-12Si alloy powder (<20 μm) of Powder Alloy Corporation (PAC), USA, which includes 0.8 wt % (max) of aluminum (Al) oxide, 11 wt % to 13 wt % of silicon (Si), 0.15 wt % of manganese (Mn), 0.30 wt % of copper (Cu), 0.80 wt % of iron (Fe), 0.20 wt % of zinc (Zn), 0.15 wt % of magnesium (Mg), and Al (Bal). The powder was dried in an oven at 70° C. for 24 hours to remove residual moisture, and filtered using a mesh into uniform-sized particles before use.

A metal structure was printed using a fiber laser having a wavelength band of 0.1 μm to 10 μm and using selective laser melting (SLM) under conditions such as laser power of 350 W, a scan speed v of 470 mm/s, a hatch spacing h of 0.21 mm, and a layer thickness t of 0.04 mm. An energy density T under the above-mentioned conditions reached up to 98 W/mm$^3$ (a porosity of about 2%) and the samples at this time exhibited a tensile strength of 350 MPa and an elongation of 3.5%. The energy density satisfies the following equation.

$$\text{Energy Density}(\tau) = \frac{\text{Laser power}}{\text{Scan speed}(v) \times \text{Layer Thickness}(t) \times \text{Hatch Spacing}(h)} \quad \text{[Equation]}$$

Thereafter, to induce strong mechanical coupling between metal and polymer, concave-convex joining patterns were formed to a predetermined size on the surface of the metal structure by using the fiber laser.

The concave-convex joining patterns were deposited in a direction perpendicular to a tensile direction, and the laser power, the scan speed, and the layer thickness were controlled to be the same as those used to form the metal structure. Micro patterns capable of serving as the concave-convex joining patterns were formed by layering one to three layers at a hatch spacing of 0.4 mm.

Thereafter, PA12 polymer was filled on the concave-convex joining patterns and then a fiber laser having a wavelength band of 0.1 μm to 10 μm was irradiated thereto such that the concave-convex patterns were filled with the melted polymer powder to form a polymer bonding layer.

The power of the fiber laser was controlled to 50 W, 100 W, 150 W, and 200 W under the same conditions such as a scan speed of 400 mm/s, a hatch spacing of 0.2 mm, and a layer thickness of 0.04 mm. Spherical PA12 polymer powder (mean particle size: 25 μm to 30 μm) of GFM was used as the polymer powder, and was dried in an oven at 70° C. for 24 hours to remove residual moisture, and filtered using a mesh into uniform-sized particles before use.

Lastly, a single polymer layer was layered on the polymer bonding layer by using selective laser sintering (SLS). Herein, a pulsed $CO_2$ laser having a wavelength band of 1 μm to 100 μm and maximum power of 60 W was used under conditions such as laser power of 35 W, a scan speed of 3000 mm/s, a hatch spacing of 0.2 mm, and a layer thickness of 50 μm.

To compare with the samples according to the test examples of the present invention, organic-inorganic hybrid structure samples were produced by differently controlling the laser type and the power. Conditions thereof are shown in Table 2. Resultant values of the test examples and the comparative examples are shown in Table 3.

TABLE 2

|  | Test Example 1 | Test Example 2 | Test Example 3 | Test Example 4 | Comp. Example 1 | Comp. Example 2 | Comp. Example 3 | Comp. Example 4 | Comp. Example 5 | Comp. Example 6 | Comp. Example 7 | Comp. Example 8 |
|---|---|---|---|---|---|---|---|---|---|---|---|---|
| Laser Type | Fiber | Fiber | Fiber | Fiber | $CO_2$ | $CO_2$ | $CO_2$ | $CO_2$ | $CO_2$ | $CO_2$ | Fiber | Fiber |
| Power [W] | 200 | 150 | 100 | 50 | 45 | 42.5 | 40 | 37.5 | 35 | 32.5 | 300 | 250 |
| Scan Speed [mm/s] | 400 | 400 | 400 | 400 | 3000 | 3000 | 3000 | 3000 | 3000 | 3000 | 400 | 400 |
| Single Layer Height [mm] | 0.04 | 0.04 | 0.04 | 0.04 | 0.04 | 0.04 | 0.04 | 0.04 | 0.04 | 0.04 | 0.04 | 0.04 |
| Hatch Spacing [mm] | 0.2 | 0.2 | 0.2 | 0.2 | 0.2 | 0.2 | 0.2 | 0.2 | 0.2 | 0.2 | 0.2 | 0.2 |
| Energy Density [W/mm³] | 62.5 | 46.87 | 31.25 | 15.62 | 1.875 | 1.770 | 1.666 | 1.562 | 1.500 | 1.354 | 93.75 | 78.12 |

TABLE 3

|  | Test Example 1 | Test Example 2 | Test Example 3 | Test Example 4 | Comp. Example 1 | Comp. Example 2 | Comp. Example 3 | Comp. Example 4 | Comp. Example 5 | Comp. Example 6 | Comp. Example 7 | Comp. Example 8 |
|---|---|---|---|---|---|---|---|---|---|---|---|---|
| Printing | ○ | ○ | ○ | ○ | Over-melted | ○ | ○ | ○ | ○ | ○ | Carbonized | Carbonized |
| Second Phase Formation | ○ | ○ | ○ | ○ | X | X | X | X | X | X | ○ | ○ |
| Bonded Part Porosity [vol %] | 5.3 | 3.2 | 4.8 | 6.5 | 3.4 | 4.2 | 6.7 | 8.3 | 10.6 | 13.2 | — | — |
| Bonding Strength [MPa] | 2.4 | 3 | 2.2 | 1.8 | ≥0.5 | ≥0.5 | ≥0.5 | Adhesive Properties X | Adhesive Properties X | Adhesive Properties X | — | — |

Figure 7:
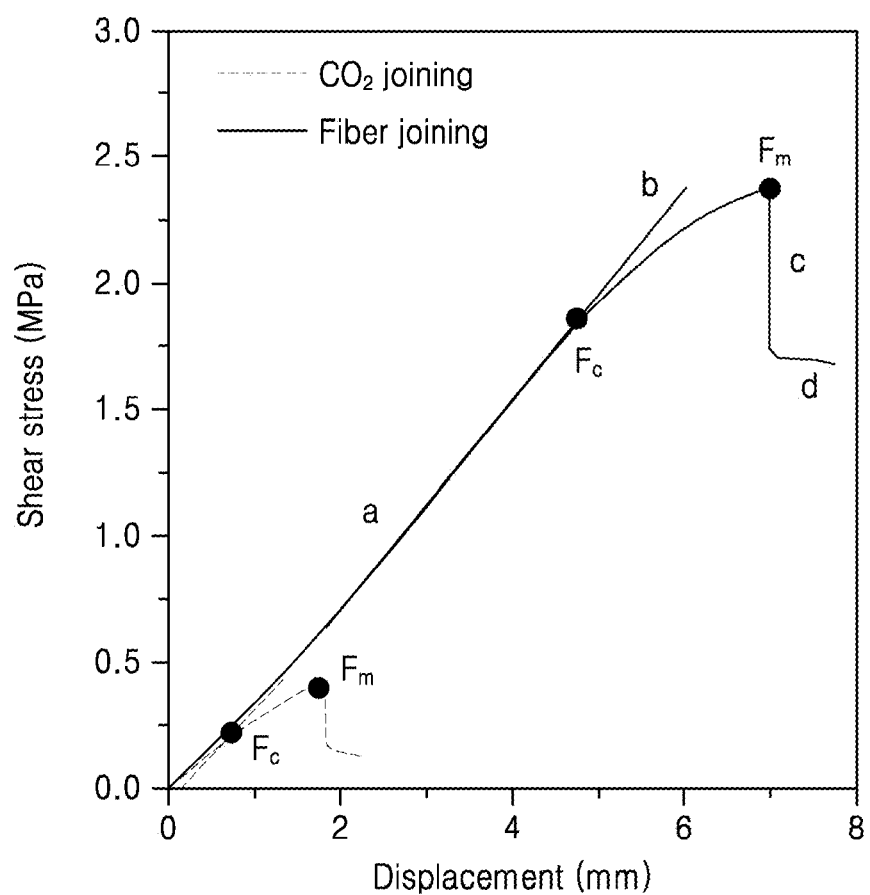
FIG. 7 is a graph showing a result of measuring bonding strengths of metal-plastic multi-layered hybrid materials according to a test example of the present invention and a comparative example (e.g., Test Example 2 and Comparative Example 3)

FIG. 7 is a graph showing a result of measuring bonding strengths of metal-plastic hybrid samples according to a test example of the present invention and a comparative example (e.g., Test Example 2 and Comparative Example 3). Referring to FIG. 7 and Tables 2 and 3, when the polymer bonding layer is formed using the fiber laser, the metal-polymer interface is well bonded without damage as indicated by a, and then is cracked as indicated by b. Thereafter, the interface exfoliates as indicated by c, and the metal and polymer layers are separated from each other as indicated by d.

On the other hand, when the polymer bonding layer is formed using the $CO_2$ laser having a wavelength band of 1 μm to 100 μm, exfoliation occurs in a range much lower than that of the case in which the polymer bonding layer is formed using the fiber laser having a wavelength band of 0.1 μm to 10 μm. Therefore, it is shown that the method of forming the polymer bonding layer by using the fiber laser having a wavelength band of 0.1 μm to 10 μm exhibits a much higher bonding strength compared to the method of forming the polymer bonding layer by using the $CO_2$ laser having a wavelength band of 1 μm to 100 μm.

Figure 8:
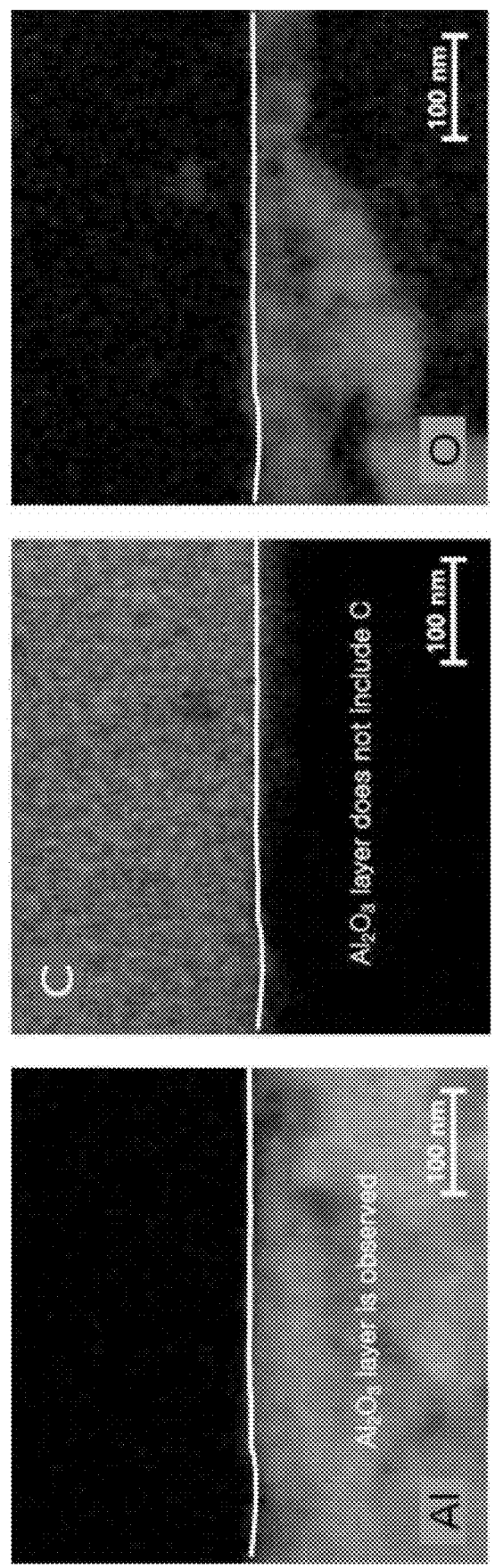
FIGS. 8, 9, and 10 show a result of analyzing microstructures of metal-plastic bonded samples according to a test example of the present invention and a comparative example (e.g., Test Example 2 and Comparative Example 3) by using transmission electron microscopy (TEM)-energy-dispersive X-ray spectroscopy (EDX)
Figure 9:
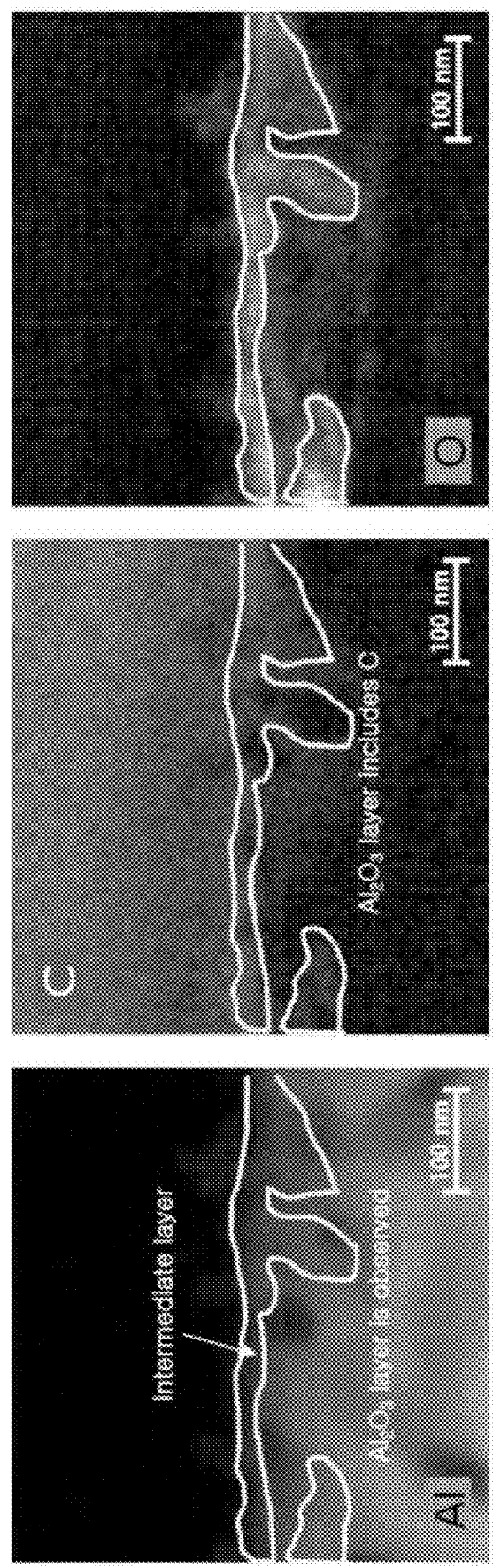
Figure 10:
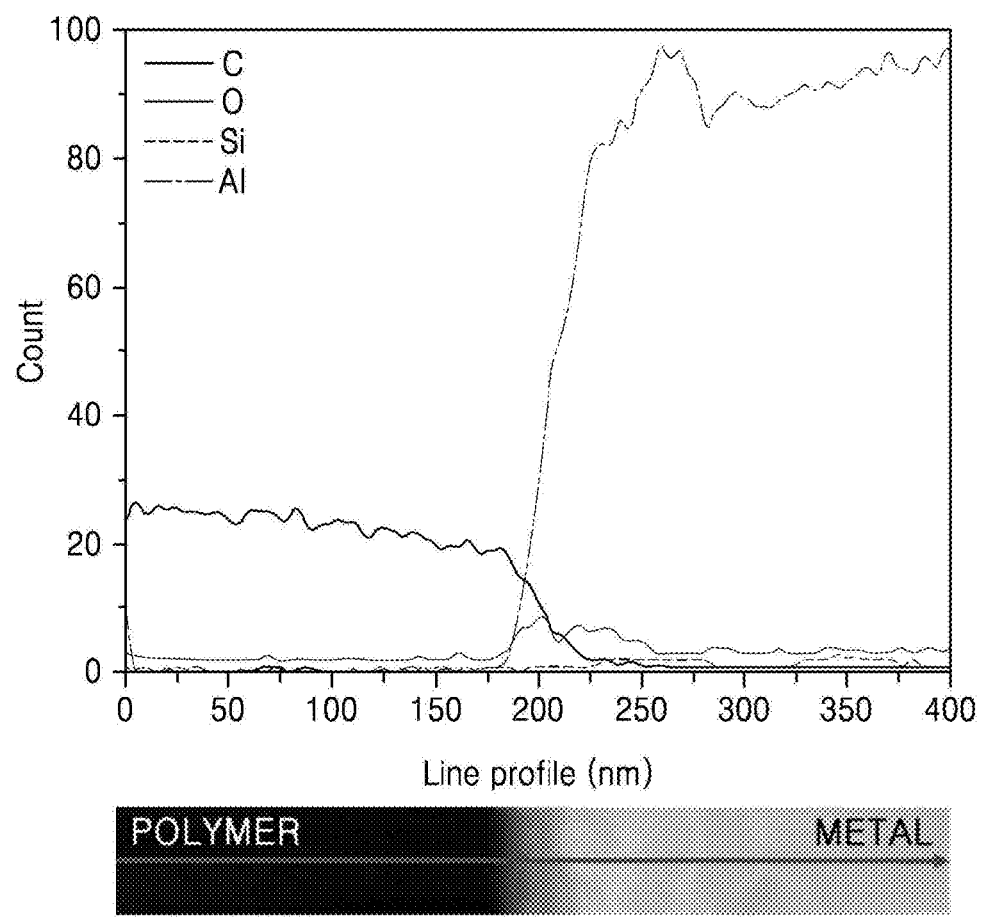

FIGS. 8 to 10 show a result of analyzing microstructures of metal-plastic hybrid samples according to a test example of the present invention and a comparative example (e.g., Test Example 2 and Comparative Example 3) by using transmission electron microscopy (TEM)-energy-dispersive X-ray spectroscopy (EDX).

The microstructures of the polymer-metal interfaces of the hybrid samples (Test Example 2 and Comparative Example 3) are observed and components at the interfaces of the samples are shown in FIG. 8 (Comparative Example 3) and FIG. 9 (Test Example 2).

Referring to FIGS. 8 and 9, in the TEM images of the sample bonded using the $CO_2$ laser having a wavelength band of 1 μm to 100 μm, element mapping images of aluminum (Al), carbon (C), and oxygen (O) show that an intermediate oxide layer is not formed at the interface between Al-12Si and PA12. On the other hand, referring to FIG. 9, in the TEM images of the sample bonded using the fiber laser, element mapping images of Al, C, and O show that an intermediate oxide layer is formed at the interface between Al-12Si and PA12. In particular, the element mapping image of Al shows that the elements 0 and C near the interface overlap with each other, and it is regarded that Al—O, Al—C, and O—C chemical bonds are induced by the fiber laser to enhance a metal-plastic interfacial strength due to the chemical linking effect.

Referring to FIG. 10 showing a line scanning result from a metal rich region to a polymer rich region in the TEM images of the Test Example 2 sample bonded using the fiber laser, an intermediate oxide layer having a thickness of 20 nm is formed.

Figure 11:
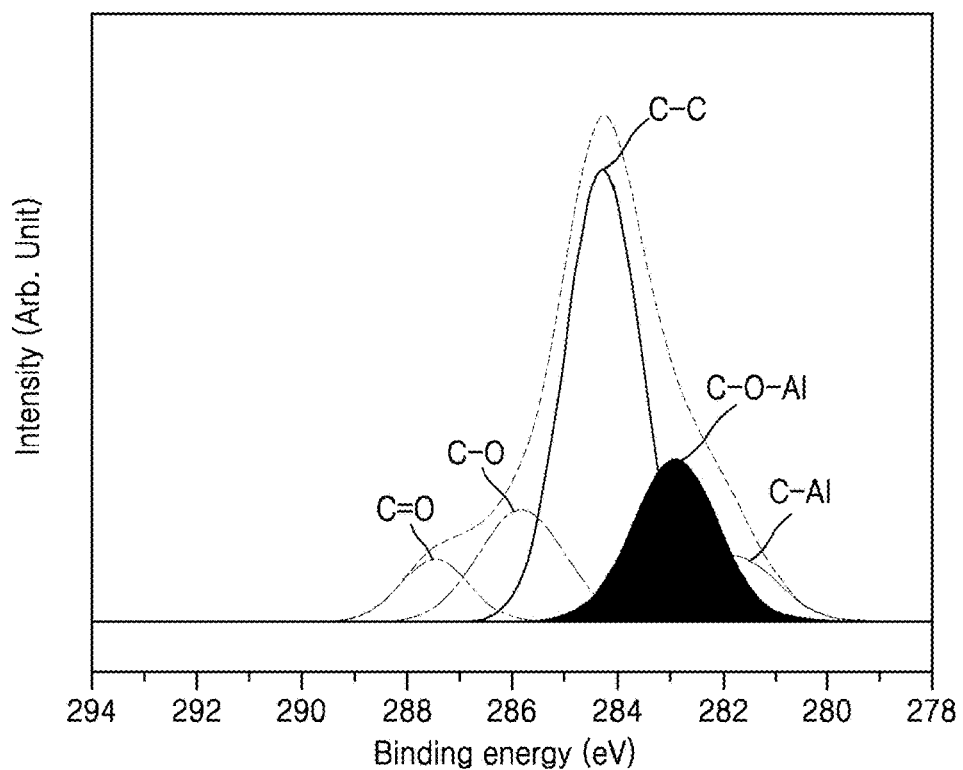
FIGS. 11 and 12 show a result of analyzing chemical bonds of a metal-plastic bonded sample according to a test example of the present invention (e.g., Test Example 2) by using X-ray photoelectron spectroscopy (XPS).
Figure 12:
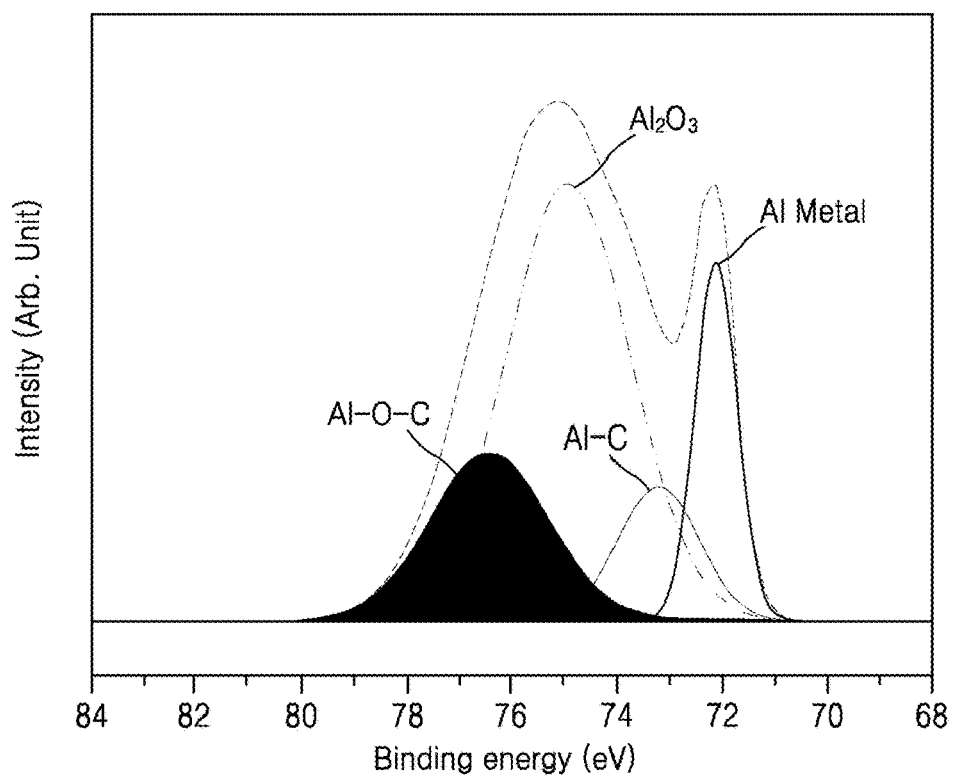

FIGS. 11 and 12 show a result of analyzing chemical bonds of a metal-plastic hybrid sample according to a test example of the present invention (e.g., Test Example 2) by using X-ray photoelectron spectroscopy (XPS). A chemical bond between the polymer and the metal in the Test Example 2 sample bonded using the fiber laser is observed, and chemical bonds of the sample for elements C1s and $Al_2p$ are shown in FIGS. 11 and 12, respectively.

Referring to FIGS. 11 and 12, a carbon-metal oxide such as Al—O—C induced by the laser is observed in the XPS C1s and $Al_2p$ results of the sample bonded using the fiber laser. It is regarded that the oxide is formed when a part of an organic group of the polymer included in the polymer bonding layer is thermally and optically decomposed by the laser and reacts with the metal or metal oxide on the surface of the metal structure, and that the second phase is an oxygen inclusion connecting carbon and the metal.

Referring back to Tables 2 and 3, the metal-plastic hybrid samples of Comparative Examples 1 to 6 using the $CO_2$ laser, the second phase is not formed at the interface. In particular, the sample of Comparative Example 1 using the highest power exhibits over-melting, and the samples of Comparative Examples 4 to 6 using the lowest powers are successfully printed but exhibit no adhesive properties.

On the other hand, the metal-plastic hybrid samples of Comparative Examples 7 and 8 using the fiber laser, the second phase is formed at the interface but carbonization occurs due to high laser powers.

Therefore, when the polymer bonding layer is formed using the $CO_2$ laser, printing may be succeeded but the second phase is not formed at the interface and poor adhesive properties are exhibited. To solve the above problem, the fiber laser may be used to form the polymer bonding layer. At this time, because the polymer bonding layer is not formed due to carbonization when the power is excessively high, the power of the 3D printing apparatus needs to be controlled to an appropriate range. However, the interface layer may not be easily formed by merely adjusting the power in the printing process, and the influence of the energy density based on the laser power, the scan speed, the single layer height, and the hatch spacing is great and thus needs to be also considered.

As described above, the present invention may provide a new innovative bottom-up process technology for processing and bonding a metal and a plastic at the same time to overcome the limitations of the existing top-down process, e.g., LAMP, and to exceed a post-process for simply bonding the metal and the plastic, and a metal-plastic multi-layered structure produced using the process technology.

According to the afore-described embodiments of the present invention, a method of producing a metal-plastic multi-layered hybrid structure by using laser 3D printing, the method being capable of preventing a problem of deformation or corrosion caused by the bonding of organic-inorganic materials, e.g., an organic polymer and an inorganic metal or ceramic, and of facilitating the control of an interface between the organic-inorganic materials, and a multi-layered structure produced using the method may be provided.

In addition, an interface between a metal and a plastic having different properties, functions, and uses may be effectively bonded using a laser in a single printing process, a complicated layered structure may be formed by highly stratifying surfaces, structures, and components, and thus an innovative bottom-up continuous production process may be provided.

Furthermore, as a metal-plastic hybrid 3D printing process in which LAMP technology and 3D printing technology are combined, an organic-inorganic hybrid 3D printing method capable of obtaining a high interfacial bonding strength at an interface between a metal and a plastic to overcome the limitations of the existing LAMP technology and to be advanced from the existing 3D printing technology may be provided, and a structure produced using the method may also be provided. However, the scope of the present invention is not limited to the above-described effects.

While the present invention has been particularly shown and described with reference to embodiments thereof, it will be understood by one of ordinary skill in the art that various changes in form and details may be made therein without departing from the scope of the present invention as defined by the following claims.

What is claimed is:

1. A method of producing a metal-plastic multi-layered hybrid structure by using laser three-dimensional (3D) printing, the method comprising:
    printing a metal structure on a substrate by using a first laser;
    patterning an upper surface of the metal structure by using the first laser;
    printing a polymer bonding layer on the patterned metal structure by using the first laser; and
    printing a polymer structure on the polymer bonding layer by using a second laser having a wavelength longer than a wavelength of the first laser,
    wherein the printing of the polymer bonding layer comprises forming an intermediate phase at an interface between the metal structure and the polymer bonding layer, and the intermediate phase comprises a carbon-metal oxide induced by the first laser.

2. The method of claim 1, wherein the intermediate phase is formed through second-order reaction at the interface between the metal structure and the polymer bonding layer, and is formed when at least any part of a polymer comprised in the polymer bonding layer is melted or sintered and reacts with a part of the metal structure.

3. The method of claim 2, wherein the carbon-metal oxide is formed when an organic group of the polymer is thermally or optically decomposed by the first laser and thus a part of the decomposed organic group reacts with a metal or metal oxide on a surface of the metal structure.

4. The method of claim 2, wherein the carbon-metal oxide comprises a compound represented by Chemical Formula 1:

M-O—C                        [Chemical Formula 1]

where M denotes a material selected from among inorganic metals and ceramics, and alloys thereof, C denotes a material selected from among polymers comprising carbon and carbon compounds, and O denotes an oxygen inclusion connecting M and C.

5. The method of claim 4, wherein at least one of M and C is an oxide or an organic group.

6. The method of claim 1, wherein, to have a high absorption rate for metals and inorganic materials, the first laser has a wavelength band ranging from 0.1 μm to 10 μm.

7. The method of claim 1, wherein the first laser comprises a fiber or yttrium aluminum garnet (YAG) laser.

8. The method of claim 1, wherein, to have a high absorption rate for polymers and organic materials, the second laser has a wavelength band ranging from 1 μm to 100 μm.

9. The method of claim 1, wherein the second laser comprises a $CO_2$ or diode laser.

10. The method of claim 1, wherein the patterning of the upper surface of the metal structure comprises forming joining patterns by etching parts of the upper surface of the metal structure by using the first laser to induce mechanical anchoring between a metal and a polymer.

11. The method of claim 1, wherein the polymer bonding layer comprises a transparent polymer.

12. The method of claim 11, wherein the polymer comprises at least one type of thermoplastic polymer resin selected from the group consisting of polylactic acid, acrylonitrile butadiene styrene, polypropylene, polyethylene, polystyrene, polyamide, polycarbonate, polyvinyl chloride, chlorinated polyvinyl chloride, styreneacrylonitrile, acrylonitrile styrene acrylate, polysulfone, polyurethane, polyphenylenesulfide, polyacetal, polyaramid, polyimide, polyester, polyester elastomer, esther acrylate, ethylene copolymer, styrene-butadiene copolymer, and vinyl acetate, or a polymer composite comprising the thermoplastic polymer resin.

13. The method of claim 1, wherein the metal structure comprises at least one type of material selected from the group consisting of stain steel, nickel, cobalt, copper, titanium, aluminium, magnesium, silicon, iron, zinc, tungsten, and manganese, or an alloy thereof.

14. The method of claim 1, wherein the printing of the polymer bonding layer comprises forming the intermediate phase by inducing chemical reaction between a metal comprised in the metal structure and a polymer comprised in the polymer bonding layer, by irradiating the first laser to the interface between the metal structure and the polymer bonding layer.

15. The method of claim 1, wherein an energy density of the first laser to print the polymer bonding layer is lower than an energy density of the first laser to print the metal structure.

16. The method of claim 1, wherein an energy density to print the polymer bonding layer is controlled by separately adjusting power of the first laser, a scan speed, a single layer height, and a hatch spacing.

17. The method of claim 1, wherein an energy density of the first laser to print the polymer bonding layer has a range in which the polymer bonding layer is not completely carbonized.

18. The method of claim 17, wherein the range in which the polymer bonding layer is not completely carbonized is 0.3 times to 0.7 times an energy density of the first laser to print the metal structure.

19. A metal-plastic multi-layered structure comprising:
    a metal structure;
    a polymer structure provided on the metal structure; and
    an intermediate phase formed at an interface between the metal structure and the polymer structure,
    wherein the intermediate phase is formed when at least any part of a polymer comprised in the polymer structure is melted or sintered by a laser and reacts with a part of the metal structure, and
    wherein the metal-plastic multi-layered structure is produced using the method of claim 1.

20. A method of producing a metal-plastic multi-layered hybrid structure by using laser three-dimensional (3D) printing, the method comprising:
    printing a metal structure on a substrate by using a first laser;
    patterning an upper surface of the metal structure by using the first laser;
    printing a polymer bonding layer on the patterned metal structure by using the first laser; and
    printing a polymer structure on the polymer bonding layer by using a second laser having a wavelength longer than a wavelength of the first laser,
    wherein the printing of the polymer bonding layer comprises forming an intermediate phase at an interface between the metal structure and the polymer bonding layer, and the intermediate phase has a 3D structure formed by cross-linking.

* * * * *